United States Patent
Lee et al.

(10) Patent No.: US 11,626,246 B2
(45) Date of Patent: Apr. 11, 2023

(54) MULTILAYER CAPACITOR

(71) Applicant: SAMSUNG ELECTRO-MECHANICS CO., LTD., Suwon-si (KR)

(72) Inventors: Jong Ho Lee, Suwon-si (KR); Hong Seok Kim, Suwon-si (KR); Dong Chan Kim, Suwon-si (KR); Eun Jeong Cho, Suwon-si (KR); Chung Eun Lee, Suwon-si (KR); Hye Bin Kim, Suwon-si (KR); Eun Joo Choi, Suwon-si (KR); Sun Ju Hwang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/399,564

(22) Filed: Aug. 11, 2021

(65) Prior Publication Data

US 2022/0139619 A1    May 5, 2022

(30) Foreign Application Priority Data

Oct. 30, 2020  (KR) .................... 10-2020-0142696

(51) Int. Cl.
| | |
|---|---|
| *H01G 4/30* | (2006.01) |
| *H01G 4/12* | (2006.01) |
| *H01G 4/10* | (2006.01) |
| *H01G 4/232* | (2006.01) |

(52) U.S. Cl.
CPC ............ *H01G 4/10* (2013.01); *H01G 4/1227* (2013.01); *H01G 4/232* (2013.01); *H01G 4/30* (2013.01)

(58) Field of Classification Search
None
See application file for complete search history.

(56) References Cited

U.S. PATENT DOCUMENTS 5,166,859 A * 11/1992 Ueno .................. C04B 41/5144
                                                29/25.42
6,008,981 A * 12/1999 Harada ................ H01G 4/1227
                                                361/309

(Continued)

FOREIGN PATENT DOCUMENTS

| JP | 2012-256647 A | 12/2012 |
|---|---|---|
| JP | 2019-192862 A | 10/2019 |

(Continued)

*Primary Examiner* — Dion R. Ferguson
(74) *Attorney, Agent, or Firm* — Morgan, Lewis & Bockius LLP (57) ABSTRACT

A multilayer capacitor includes a body including a multi-layer structure in which a plurality of dielectric layers are provided and a plurality of internal electrodes are stacked with the dielectric layer interposed therebetween and external electrodes disposed outside the body and connected to the plurality of internal electrodes. The body includes a high resistance portion disposed in at least one region between the dielectric layer and the internal electrode and inside the dielectric layer and having electric resistance higher than electric resistance of the internal electrode, and the high resistance portion and the plurality of internal electrodes include the same metal component and the same metal oxide component.

24 Claims, 6 Drawing Sheets

A (56) References Cited

U.S. PATENT DOCUMENTS

| | | | |
|---|---|---|---|
| 6,185,087 B1 * | 2/2001 | Park | H01G 4/1227 361/321.5 |
| 2004/0090721 A1 * | 5/2004 | Nagai | H01C 1/14 361/15 |
| 2005/0286204 A1 * | 12/2005 | Yamaguchi | H01G 4/0085 361/301.5 |
| 2007/0128794 A1 * | 6/2007 | Kusano | H01G 4/2325 257/314 |
| 2009/0002920 A1 * | 1/2009 | Itamura | H01G 4/2325 361/321.3 |
| 2012/0033344 A1 * | 2/2012 | Nakamura | C04B 35/4682 501/137 |
| 2013/0009516 A1 * | 1/2013 | Kim | H01G 4/12 336/200 |
| 2014/0125194 A1 * | 5/2014 | Lee | H01L 41/0472 336/200 |
| 2014/0376150 A1 * | 12/2014 | Kim | H01G 4/30 361/301.4 |
| 2015/0155098 A1 | 6/2015 | Yamaguchi et al. | |
| 2017/0186542 A1 * | 6/2017 | Lee | H01G 4/232 |
| 2019/0333698 A1 * | 10/2019 | Sugita | H01G 4/2325 |
| 2021/0155547 A1 * | 5/2021 | Nomura | C04B 35/057 |
| 2022/0139619 A1 * | 5/2022 | Lee | H01G 4/10 361/301.4 |

FOREIGN PATENT DOCUMENTS

| | | |
|---|---|---|
| KR | 10-2006-0125277 A | 12/2006 |
| KR | 10-2015-0036428 A | 4/2015 |

\* cited by examiner

MULTILAYER CAPACITOR

CROSS-REFERENCE TO RELATED APPLICATION

This application claims benefit of priority to Korean Patent Application No. 10-2020-0142696 filed on Oct. 30, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is a device capable of storing electricity in which electricity is generally accumulated in each of two facing electrodes when a voltage is applied thereto. When a direct current (DC) voltage is applied, current flows in the capacitor, while electricity is accumulated therein, and when accumulating is completed, no current flows. Meanwhile, when an alternating current (AC) voltage is applied, AC current flows, while polarities of electrodes alternate.

Capacitors may be classified into various types such as an aluminum electrolytic capacitor in which electrodes are formed of aluminum and a thin oxide film is provided between the aluminum electrodes, a tantalum capacitor using tantalum as a material of electrodes, a ceramic capacitor using a high-k dielectric material such as titanium, barium, or the like, between electrodes, a multilayer ceramic capacitor (MLCC) using a multilayer structure of high-k ceramics as a dielectric material provided between electrodes, a film capacitor using a polystyrene film as a dielectric material between electrodes, and the like.

Among the capacitors, the MLCC advantageously has excellent temperature characteristics and frequency characteristics, may be implemented in a small size, and thus has been widely applied in various fields such as high-frequency circuits. In recent years, attempts to implement a smaller multilayer ceramic capacitor have continued, and to this end, a dielectric layer and an internal electrode are formed to be thin. As the dielectric layer becomes thinner, an electric field applied to the dielectric layer at the same driving voltage increases, and thus, a DC bias capacity, which is an effective capacity of the MLCC, needs to be sufficiently secured when a DC electric field is applied. In addition, it is necessary to design the MLCC to minimize a high-temperature effective capacity reduction phenomenon due to heating in line with the trend of integration and miniaturization of electronic devices in which the MLCC is used.

SUMMARY

An aspect of the present disclosure may provide a multilayer capacitor in which DC bias capacity may be improved by employing a high resistance portion in a region between an internal electrode and a dielectric layer.

According to an aspect of the present disclosure, a multilayer capacitor may include a body including a multilayer structure in which a plurality of dielectric layers are provided and a plurality of internal electrodes are stacked with the plurality of dielectric layers interposed therebetween; and external electrodes formed outside the body and connected to the plurality of internal electrodes. The body may include a high resistance portion disposed in at least one region among a region between the plurality of dielectric layers and the internal electrode and an inside of the plurality of dielectric layers and having electric resistance higher than electric resistance of the internal electrode, and the high resistance portion and the plurality of internal electrodes may include the same metal component and the same metal oxide component.

The metal component of the high resistance portion may have an electrical resistance higher than that of a main component of the internal electrode.

The metal component may include at least one selected from the group consisting of Ag, Cu, Au, Sn, In, Al, bi, Sb, Ge, and Te.

The metal oxide component of the high resistance portion may have a positive temperature coefficient of resistivity (PTCR) characteristic in which electrical resistance increases as temperature increases.

The PTCR characteristic of the metal oxide component of the high resistance portion may appear up to a phase transition temperature Tc of barium titanate.

In an exemplary embodiment, the metal oxide component of the high resistance portion may include at least one oxide selected from the group consisting of Mn and V.

The high resistance portion may include a first region in a layer structure between the plurality of dielectric layers and the internal electrode and a second region inside the plurality of dielectric layers, the first region may include the same metal component as the metal component included in the internal electrode, and the second region may include the same metal oxide component as the metal oxide component included in the internal electrode.

A specific resistance of the first region may be 10 times or more of a specific resistance of the plurality of dielectric layers in a temperature range of 50° C. to 125° C.

A thickness of the first region may be $1/10$ to $1/1000$ of a thickness of the plurality of dielectric layers.

A specific resistance of the first region may be 10 times or more of a specific resistance of the plurality of dielectric layers.

The first region may occupy an area of 70% or more of an interface between the plurality of dielectric layers and the internal electrode.

The second region may be disposed in a region of the plurality of dielectric layers adjacent to the internal electrode.

A thickness of the second region may be $1/10$ to $1/1000$ of a thickness of the plurality of dielectric layers.

The second region may be disposed in the entire dielectric layer.

The high resistance portion may include first and second regions formed in a layer structure between the plurality of dielectric layers and the internal electrode, the first region may include the same metal component as a metal component included in the internal electrode, and the second region may include the same metal oxide component as a metal oxide component included in the internal electrode.

The first region and the second region may be disposed at the same level.

The first region and the second region may be stacked in a thickness direction of the plurality of dielectric layers.

The second region may also be disposed inside the plurality of dielectric layers.

According to an aspect of the present disclosure, a multilayer capacitor may include a body including an internal electrode and a dielectric layer; and an external electrode disposed on the body and connected to the internal electrode. The body includes a portion disposed inside of the dielectric layer and including the same metal component and the same metal oxide component as the internal electrode.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
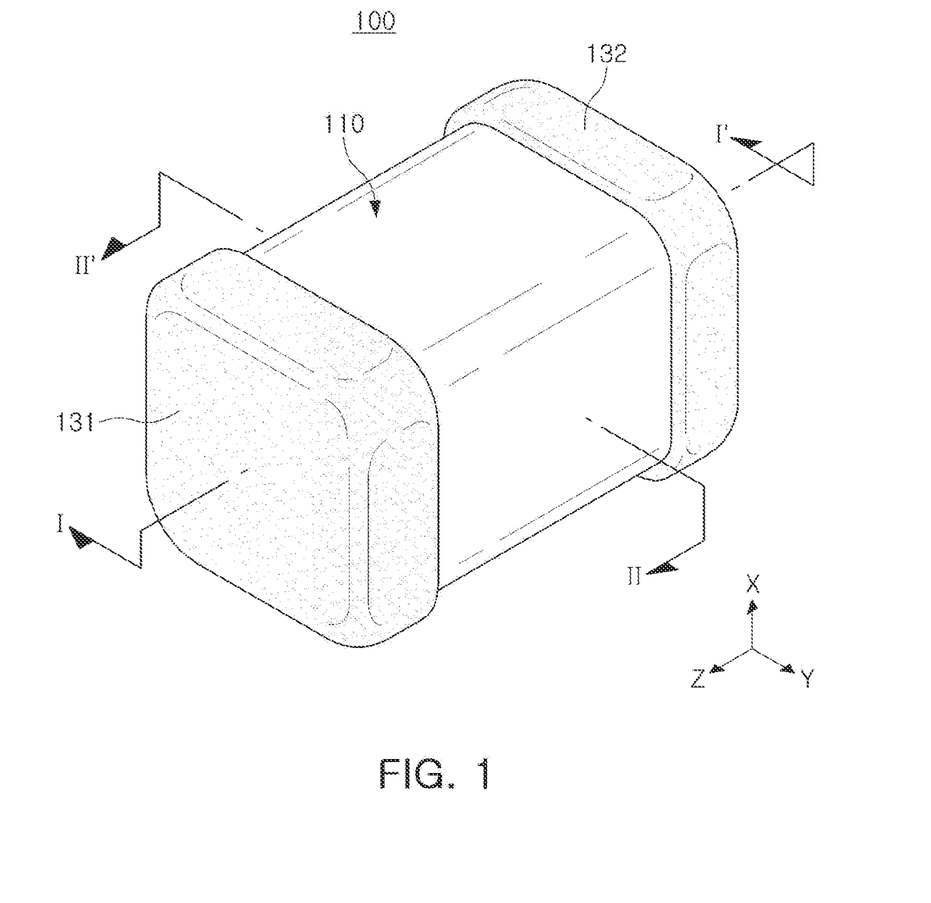
FIG. 1 is a perspective view schematically showing an appearance of a multilayer capacitor according to an exemplary embodiment in the present disclosure.
Figure 2:
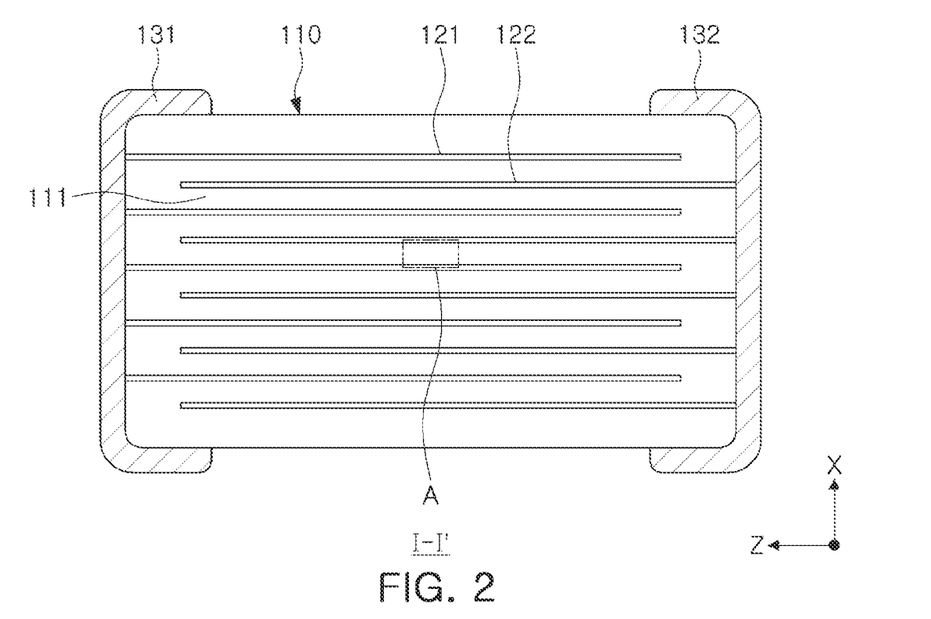
FIG. 2 is a cross-sectional view of the multilayer capacitor of FIG. 1, taken along line I-I'.
Figure 3:
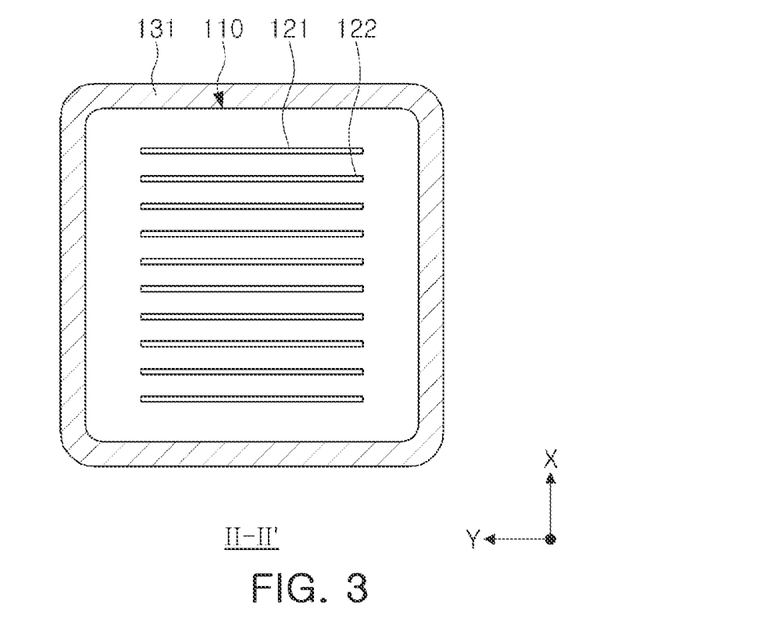
FIG. 3 is a cross-sectional view of the multilayer capacitor of FIG. 1, taken along line II-II
Figure 4:
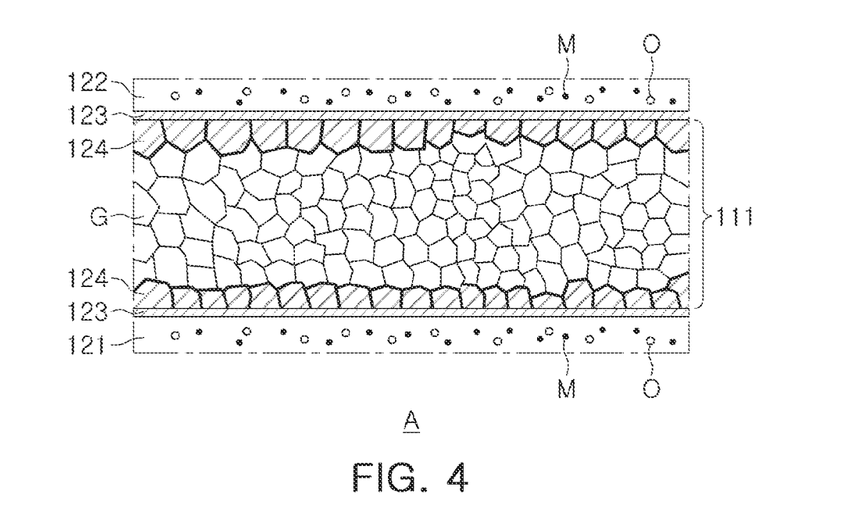
' and FIG. 4 is an enlarged view of region A in FIG. 2.
Figure 5:
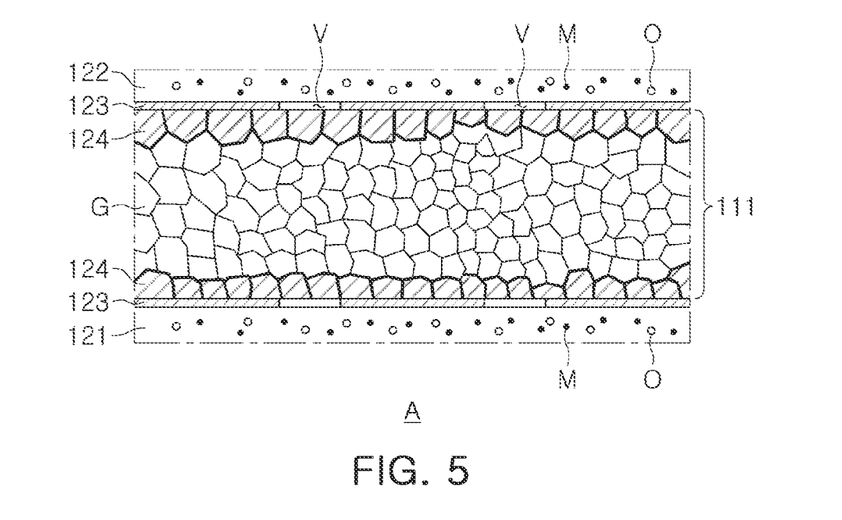
FIGS. 5 through 10 show shapes of internal electrodes and dielectric layers that may be employed in a modification.
Figure 6:
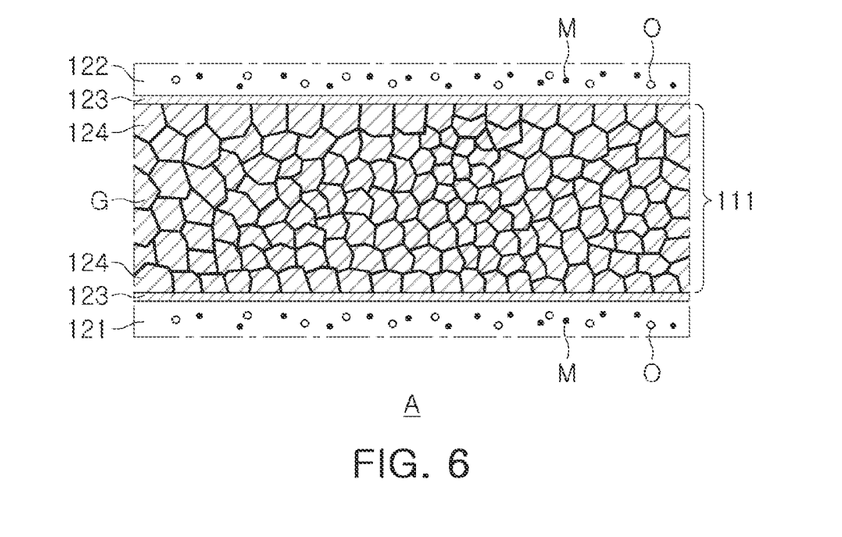
Figure 7:
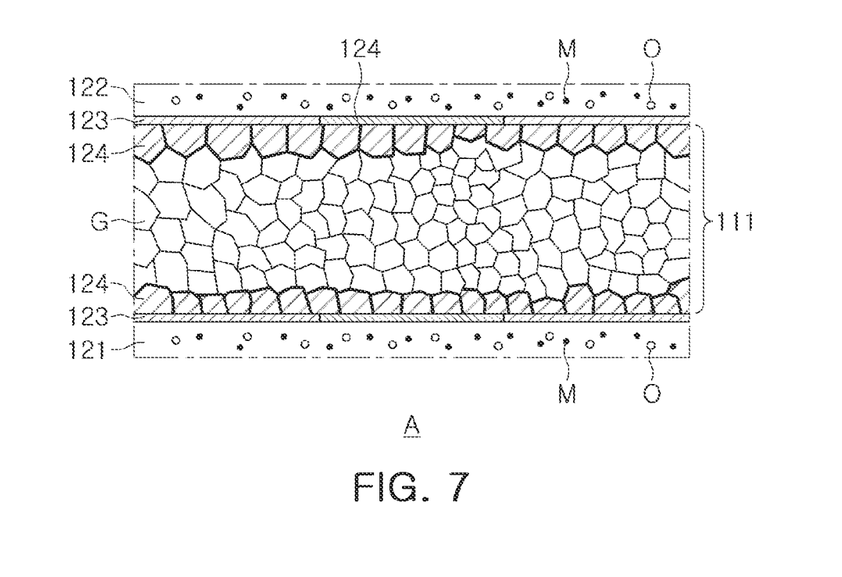
Figure 8:
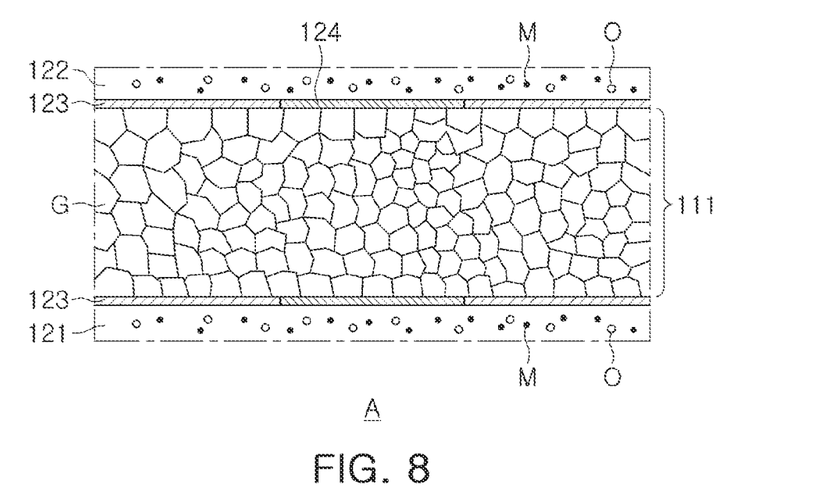

FIG. 1 is a perspective view schematically showing an appearance of a multilayer capacitor according to an exemplary embodiment in the present disclosure. FIG. 2 is a cross-sectional view of the multilayer capacitor of FIG. 1, taken along line I-I'. FIG. 3 is a cross-sectional view of the multilayer capacitor of FIG. 1, taken along line II-II' and FIG. 4 is an enlarged view of region A in FIG. 2. FIGS. 5 through 10 show shapes of internal electrodes and dielectric layers that may be employed in a modification.

Referring to FIGS. 1 through 4, a multilayer capacitor 100 according to an exemplary embodiment in the present disclosure includes a body 110 including a dielectric layer 111 and a plurality of internal electrodes 121 and 122 stacked with the dielectric layer 111 interposed therebetween and external electrodes 131 and 132. The body 110 includes high resistance portions 123 and 124 disposed in at least one region among a region between the dielectric layer 111 and the internal electrodes 121 and 122 and an inside of the dielectric layer 111 and having electrical resistance higher than those of the internal electrodes 121 and 122. In this exemplary embodiment, the high resistance portions 123 and 124 include both a first region 123 formed in a layer structure between the dielectric layer 111 and the internal electrodes 121 and 122 and a second region 124 formed inside the dielectric layer 111. In addition, the high resistance portions 123 and 124 and the internal electrodes 121 and 123 include the same metal and metal oxide components.

The body 110 includes a multilayer structure in which a plurality of dielectric layers 111 are stacked in a first direction (X direction) and may be obtained, for example, by stacking a plurality of green sheets and then sintering the plurality of green sheets. Through the sintering process, the plurality of dielectric layers 111 may have an integrated form and include a plurality of grains G. Also, as shown in FIG. 1, the body 110 may have a shape similar to a rectangular parallelepiped. The dielectric layer 111 included in the body 110 may include a ceramic material having a high dielectric constant, for example, BT-based, i.e., a barium titanate (BaTiO$_3$)-based ceramic, but other materials known in the art may also be used as long as sufficient capacitance is obtained. The dielectric layer 111 may further include an additive, an organic solvent, a plasticizer, a binder, and a dispersant, if necessary, along with such a ceramic material as a main ingredient. Here, the additive may be added in the form of a metal oxide during a manufacturing process. An example of such a metal oxide additive may include at least one of MnO$_2$, Dy$_2$O$_3$, BaO, MgO, Al$_2$O$_3$, SiO$_2$, Cr$_2$O$_3$, and CaCO$_3$.

The plurality of internal electrodes 121 and 122 may be obtained by printing a paste containing a conductive metal to a predetermined thickness on one surface of a ceramic green sheet and then sintering the paste. In this case, the plurality of internal electrodes 121 and 122 may include first and second internal electrodes 121 and 122 exposed in a direction of the body 110 facing each other. The first and second internal electrodes 121 and 122 may be connected to different external electrodes 131 and 132 to have opposite polarities when driven, and may be electrically separated from each other by a dielectric layer 111 disposed therebetween. However, the number of the external electrodes 131 and 132 or a method for connecting the external electrodes with the internal electrodes 121 and 122 may vary according to exemplary embodiments. The main ingredient materials of the internal electrodes 121 and 122 may include nickel (Ni), palladium (Pd), and the like, and alloys thereof may also be used.

In addition, in the case of the present exemplary embodiment, the internal electrodes 121 and 122 may include a metal component M having an electrical conductivity lower than that of the main component such as Ni, and an example of such a metal component M may be Ag, Cu, Au, Zn, Sn, In, Al, Bi, Sb, Ge, and Te. In addition, in addition to the metal component M, the internal electrodes 121 and 122 include a metal oxide component O. The metal component M having low electrical conductivity and the metal oxide component O additionally added in the internal electrodes 121 and 122 may be spread to the interface between the internal electrodes 121 and 122 and the dielectric layer 111 during a firing process to form the high resistance portions 123 and 124, which will be described later.

The external electrodes 131 and 132 may be formed outside the body 110 and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110. Examples of the conductive metal include nickel (Ni), copper (Cu), palladium (Pd), gold (Au), or alloys thereof. Here, the external electrodes 131 and 132 may further include a plating layer including Ni, Sn, or the like.

In the case of this exemplary embodiment, the body 110 includes the high resistance portions 123 and 124, and the high resistance portions 123 and 124 include a first region 123 and a second region 124. The first region 123 may be implemented in a layered form including the same metal component as that included in the internal electrodes 121 and 122. As an example for implementing the first region 123, the high-resistance metal component added to the internal electrodes 121 and 122 may be spread and segregated at a boundary between the internal electrodes 121 and 122 and the dielectric layer 111 during the firing process. Since the first region 123 thus formed has a high electrical resistance compared to the main component (e.g., Ni) of the internal electrodes 121 and 122, a voltage drop occurs larger than that in the absence of the first region 123 when a DC voltage is applied. Due to this action, an electric field in the dielectric layer 111 may be weakened and DC bias capacitance characteristics and reliability of the multilayer capacitor 100 may be improved accordingly. According to an exemplary embodiment, the same metal component as the internal electrodes 121 and 122 may not exist only in the first region 123 and some may be spread into the dielectric layer 111 and exist in the second region 124.

As described above, the first region 123 of the high resistance portion may have a relatively high electrical resistance compared to the main components of the internal electrodes 121 and 122, thereby obtain the effect of lowering the electric field in the dielectric layer 111. In consideration of this function, the first region 123 has a certain level of thickness. If the first region 123 is too thick, the electrical characteristics may deteriorate. Accordingly, in the present exemplary embodiment, a thickness of the first region 123 is set to a level of 1/10 to 1/1000 of a thickness of the dielectric layer 111. In this case, a specific resistance of the first region 123 may be 10 times or more of a specific resistance of the dielectric layer 111 in a temperature range of 50° C. to 125° C.

The metal component M present in the first region 123 may exist alone or may form an intermetallic compound with the main component (e.g., Ni) of the internal electrodes 121 and 122. Also, as in a modification of FIG. 5, the first region 123 may only be formed in a portion of the interface between the dielectric layer 111 and the internal electrodes 121 and 122, rather than the entire region thereof. That is, empty spaces V may exist at the interface between the dielectric layer 111 and the internal electrodes 121 and 122, and at least some of the empty spaces V may be filled with a material forming the dielectric layer 111 or the internal electrodes 121 and 122. Even when the first region 123 is formed in a portion of the interface between the dielectric layer 111 and the internal electrodes 121 and 122, the first region 123 may be formed to occupy an area of at least 70% of the interface between the dielectric layer 111 and the internal electrodes 121 and 122 in order to function as the high resistance portion described above.

In one example, an area percentage may be obtained by measuring a cross-sectional cut surface of the body 110. The cut surface may include a cut surface cut the body 110 in the first direction (X direction)-third direction (Z direction) plane, or a cut surface cut the body 110 in the first direction (X direction)-second direction (Y direction) plane. In a case that the cut surface includes a surface cut the body 110 in the first direction (X direction)-third direction (Z direction) plane, the cut surface may cut a central portion of the body 110 in the second direction (Y direction), and in a case that the cut surface includes a surface cut the body 110 in the first direction (X direction)-second direction (Y direction) plane, the cut surface may cut a central portion of the body 110 in the third direction (Z direction). The location of the cut surface is not limited to these examples, and one of ordinary skill may select the cut surface at other locations in the body 110, if needed. The area percentage of an element may refer to a ratio of a length of the element in one measured region in the cut surface to an overall length of the measured region. The measured region measured may be set by one of ordinary skill in the art, and in one example, the measured region may be located in a central portion of the cut surface. If needed, multiple measurements may be performed at various regions set by one of ordinary skill in the art so that the area percentage may be obtained by averaging the multiple measurements. In one example, a scanning electron microscope (SEM) may be used in the measurement, although the present disclosure is not limited thereto. Other methods and/or tool s appreciated by one of ordinary skill in the art, even if not described in the present disclosure, may also be used.

Similar to the area percentage, a thickness of an element of the body 110 may be measured in the cross-sectional cut. In one example, the thickness of the element of the body 110 may mean a dimension in the first direction (X), and may be one of an average thickness, a maximum thickness, and a thickness of the element measured in the measured region. In one example, the thickness of the element may be determined by defining a predetermined number (e.g., 5) of points to the left and the predetermined number (e.g., 5) of points to the right from a reference center point of the element at equal intervals (or non-equal intervals, alternatively), measuring a thickness of each of the points at equal intervals (or non-equal intervals, alternatively), and obtaining an average value therefrom. Alternatively, an average thickness may be the average value of thicknesses of a predetermined number of layers in the body (e.g., 10 layers including 5 layers in the upper portion of the body starting from the center portion of the body and 5 layers in the lower portion of the body starting from the center portion of the body), and the average thickness may be calculated by dividing the total thicknesses of the predetermined number of layers by the predetermined number of layers. Alternatively, the thickness may be the maximum thickness of the multiple measurements. Alternatively, the thickness may be a thickness of the reference center point in the measured region.

Referring back to FIG. 4, the second region 124 is formed inside the dielectric layer 111 and may include the same metal oxide component O as that included in the internal electrodes 121 and 122. In this case, as illustrated, the second region 124 may be formed in a region of the dielectric layer 111 adjacent to the internal electrodes 121 and 122 and may be formed in a plurality of grains G included in the dielectric layer 111 and a grain boundary formed by the plurality of grains G. However, the second region 124 may only be formed inside of the grain G or at the grain boundary.

The second region 124 may include the same metal oxide component O as the internal electrodes 121 and 122, which may be spread from the internal electrodes 121 and 122. The second region 124 may increase electrical insulation of the dielectric layer 111, and accordingly, a DC bias voltage characteristic of the multilayer capacitor 100 may be improved. As illustrated, the second region 124 may be formed in a region of the dielectric layer 111 adjacent to the internal electrodes 121 and 122, and in this case, a thickness of the second region 124 may be formed to be 1/10 to 1/1000 of a thickness of the dielectric layer 111. However, as in the modification of FIG. 6, when a method of accelerating spreading of the metal oxide component O is used, the second region 124 may be formed in the entire dielectric layer 111.

As in the present exemplary embodiment, by forming the second region 124 having the metal oxide component O in the dielectric layer 111, a withstand voltage characteristic of the dielectric layer 111 may be improved. In this case, the metal oxide component O of the second region 124 may have a positive temperature coefficient of resistivity (PTCR) that resistance increases as a temperature increases. In this way, when the metal oxide component O has the PTCR characteristic, the withstand voltage characteristic of the dielectric layer 111 may be more effectively improved. In addition, such PTCR characteristic may occur up to a vicinity of a phase transition temperature Tc of barium titanate (BaTiO$_3$). Donor elements exhibiting the PTCR characteristic may include Ba, Ti, Sb, Bi, La, Ce, Dy, Ho, Cu, Cr, Mg, etc., and the second region 124 may be formed in the form of oxides of these elements. In addition, the second region 124 may include transition metals such as V and Mn or oxides of such transition metals, and in this case, the same effect as that of PTCR may be obtained.

Meanwhile, the second region 124 may be formed in a layer structure in the same manner as the first region 123 in addition to being formed inside the dielectric layer 111. In this case, as in a modification of FIG. 7, the first region 123 and the second region 124 may be implemented in a form disposed at the same level. Even in this case, the second region 124 may be formed inside the dielectric layer 111. However, as in a modification of FIG. 8, the second region 124 may only be formed in a layer structure and may not exist inside the dielectric layer 111.

Figure 9:
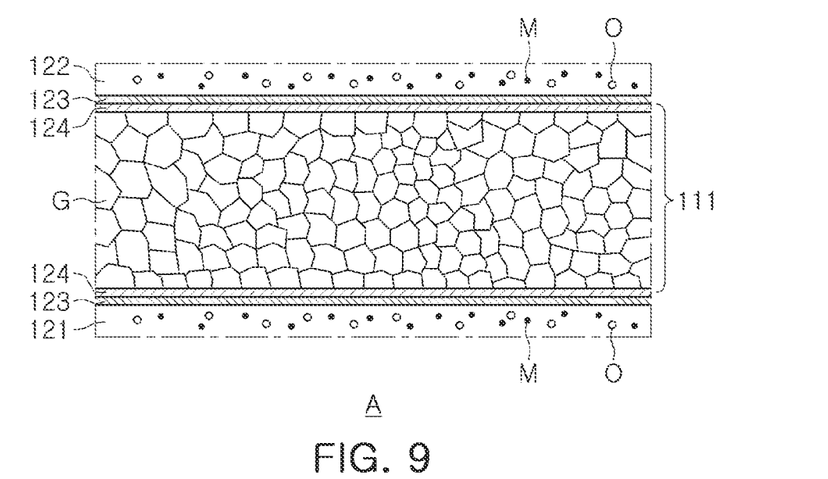
Figure 10:
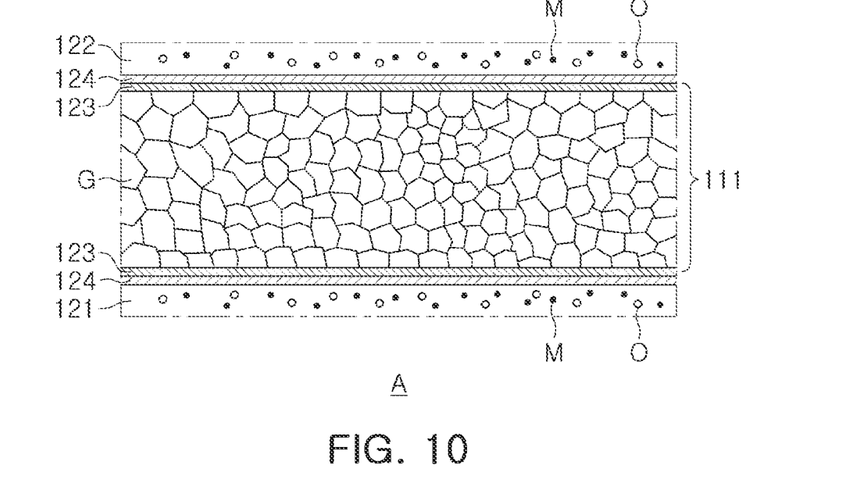

In addition, as another modification, the first region 123 and the second region 124 may be implemented to be stacked in the thickness direction of the dielectric layer 111. Specifically, as shown in FIG. 9, the second region 124 may be disposed between the first region 123 and the dielectric layer 111. Alternatively, as shown in FIG. 10, the first region 123 may be disposed between the second region 124 and the dielectric layer 111. In addition, although not shown in the exemplary embodiments of FIGS. 9 and 10, the second region 124 may also be formed in the dielectric layer 111 similar to the exemplary embodiment described above.

As set forth above, in the multilayer capacitor according to exemplary embodiments of the present disclosure, DC bias voltage characteristics may be improved and effective capacity may be increased even when a component is miniaturized.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a multilayer structure in which a plurality of dielectric layers are provided and a plurality of internal electrodes are stacked with the dielectric layer interposed therebetween; and
external electrodes disposed outside the body and connected to the plurality of internal electrodes,
wherein the body includes a high resistance portion disposed in at least one region among a region between the dielectric layer and the internal electrode and an inside of the dielectric layer and having electric resistance higher than electric resistance of the internal electrode, and the high resistance portion and the plurality of internal electrodes include the same metal component and the same metal oxide component,
the high resistance portion includes first and second regions being in contact each other,
the first region includes the same metal component as a metal component included in the internal electrode, and
the second region includes the same metal oxide component as a metal oxide component included in the internal electrode.

2. The multilayer capacitor of claim 1, wherein the metal component of the high resistance portion has an electrical resistance higher than that of a main component of the internal electrode.

3. The multilayer capacitor of claim 2, wherein the metal component includes at least one selected from the group consisting of Ag, Cu, Au, Sn, In, Al, Bi, Sb, Ge, and Te.

4. The multilayer capacitor of claim 1, wherein the metal oxide component of the high resistance portion has a positive temperature coefficient of resistivity (PTCR) characteristic in which electrical resistance increases as temperature increases.

5. The multilayer capacitor of claim 1, wherein the first region is a layer structure between the dielectric layer and the internal electrode, and the second region is disposed inside the dielectric layer.

6. The multilayer capacitor of claim 1, wherein a specific resistance of the first region is 10 times or more of a specific resistance of the dielectric layer in a temperature range of 50° C. to 125° C.

7. The multilayer capacitor of claim 1, wherein a thickness of the first region is $\frac{1}{10}$ to $\frac{1}{1000}$ of a thickness of the dielectric layer.

8. The multilayer capacitor of claim 1, wherein the first region occupies an area of 70% or more of an interface between the dielectric layer and the internal electrode.

9. The multilayer capacitor of claim 1, wherein the second region is disposed in a region of the dielectric layer adjacent to the internal electrode.

10. The multilayer capacitor of claim 9, wherein a thickness of the second region is $\frac{1}{10}$ to $\frac{1}{1000}$ of a thickness of the dielectric layer.

11. The multilayer capacitor of claim 1, wherein the second region is disposed in the entire dielectric layer.

12. The multilayer capacitor of claim 1, wherein the first and second regions are a layer structure between the dielectric layer and the internal electrode.

13. The multilayer capacitor of claim 1, wherein the first region and the second region are disposed at the same level.

14. The multilayer capacitor of claim 1, wherein the first region and the second region are stacked in a thickness direction of the dielectric layer.

15. The multilayer capacitor of claim 1, wherein the second region is also disposed inside the dielectric layer.

16. A multilayer capacitor comprising:
a body including an internal electrode and a dielectric layer; and
an external electrode disposed on the body and connected to the internal electrode,
wherein the body includes a portion disposed inside of the dielectric layer and including the same metal component and the same metal oxide component as the internal electrode, and
the metal oxide component includes at least one oxide selected from the group consisting of Mn and V.

17. The multilayer capacitor of claim 16, wherein the metal component includes at least one selected from the group consisting of Ag, Cu, Au, Sn, In, Al, Bi, Sb, Ge, and Te.

18. The multilayer capacitor of claim 16, wherein the metal oxide component has a positive temperature coefficient of resistivity (PTCR) characteristic in which electrical resistance increases as temperature increases.

19. The multilayer capacitor of claim 16, wherein the portion includes a first region in a layer structure between the dielectric layer and the internal electrode and a second region inside the dielectric layer, the first region includes the same metal component as the metal component included in the internal electrode, and the second region includes the same metal oxide component as the metal oxide component included in the internal electrode.

20. The multilayer capacitor of claim 19, wherein the first region occupies an area of 70% or more of an interface between the dielectric layer and the internal electrode.

21. The multilayer capacitor of claim 16, wherein the portion includes first and second regions in a layer structure between the dielectric layer and the internal electrode, the first region includes the same metal component as a metal component included in the internal electrode, and the second region includes the same metal oxide component as a metal oxide component included in the internal electrode.

22. The multilayer capacitor of claim 21, wherein the second region is also disposed inside the dielectric layer.

23. A multilayer capacitor comprising:
a body including a multilayer structure in which a plurality of dielectric layers are provided and a plurality of internal electrodes are stacked with the dielectric layer interposed therebetween; and
external electrodes disposed outside the body and connected to the plurality of internal electrodes,
wherein the body includes a high resistance portion disposed in at least one region among a region between the dielectric layer and the internal electrode and an inside of the dielectric layer and having electric resistance higher than electric resistance of the internal electrode, and the high resistance portion and the plurality of internal electrodes include the same metal component and the same metal oxide component,
the metal oxide component of the high resistance portion has a positive temperature coefficient of resistivity (PTCR) characteristic in which electrical resistance increases as temperature increases, and
the PTCR characteristic of the metal oxide component of the high resistance portion appears up to a phase transition temperature Tc of barium titanate.

24. A multilayer capacitor comprising:
a body including a multilayer structure in which a plurality of dielectric layers are provided and a plurality of internal electrodes are stacked with the dielectric layer interposed therebetween; and
external electrodes disposed outside the body and connected to the plurality of internal electrodes,
wherein the body includes a high resistance portion disposed in at least one region among a region between the dielectric layer and the internal electrode and an inside of the dielectric layer and having electric resistance higher than electric resistance of the internal electrode, and the high resistance portion and the plurality of internal electrodes include the same metal component and the same metal oxide component, and
the metal oxide component of the high resistance portion includes at least one oxide selected from the group consisting of Mn and V.

* * * * *